United States Patent
Brickell et al.

(10) Patent No.: US 10,491,605 B2
(45) Date of Patent: Nov. 26, 2019

(54) SECURE INTERFACE USING NON-SECURE ELEMENT PROCESSORS

(71) Applicant: GOOGLE INC., Mountain View, CA (US)

(72) Inventors: Justin Lee Brickell, San Francisco, CA (US); Jonathan Kingsley Blatter, New York, NY (US); Bobby Wieler, New York, NY (US); Harry Lee Butler, IV, New York, NY (US); Ignacio Carlos Blanco, San Francisco, CA (US); Denis Lila, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 15/333,944

(22) Filed: Oct. 25, 2016

(65) Prior Publication Data

US 2017/0104765 A1 Apr. 13, 2017

Related U.S. Application Data

(63) Continuation of application No. 14/469,560, filed on Aug. 26, 2014, now abandoned, which is a (Continued)

(51) Int. Cl.
*H04L 29/06* (2006.01)
*G06Q 20/40* (2012.01)
(Continued)

(52) U.S. Cl.
CPC ............ *H04L 63/123* (2013.01); *G06F 21/45* (2013.01); *G06Q 20/3227* (2013.01);
(Continued)

(58) Field of Classification Search
CPC .... H04L 63/123; G06F 21/45; G06Q 20/3227
(Continued)

(56) References Cited

U.S. PATENT DOCUMENTS

| | | |
|---|---|---|
| 5,940,510 A | 8/1999 | Curry et al. |
| 5,949,880 A | 9/1999 | Curry et al. |

(Continued)

FOREIGN PATENT DOCUMENTS

| | | |
|---|---|---|
| JP | 2006-507563 A | 3/2006 |
| JP | 2010-277538 A | 12/2010 |

(Continued)

OTHER PUBLICATIONS

Ziaie, "Canada Office Action received for Canada Patent Application No. 2,929,217", dated Apr. 7, 2017, 3 pages.

(Continued)

*Primary Examiner* — Jason K Gee
*Assistant Examiner* — Angela R Holmes
(74) *Attorney, Agent, or Firm* — Johnson, Marcou & Isaacs, LLC

(57) ABSTRACT

A bundle of public counters and a corresponding bundle of private counters are created and transmitted to a user device. The user device receives a request and processes the request without accessing a secure element processor on the user device. The user device calculates a security code using the private counter and a number. The user device transmits the calculated security code and one of the bundle of public counters in response to the request. A receiver of the response to the request determines the validity of the public counter and looks up the corresponding private counter using the public counter. The receiver determines the validity of the security code by recomputing it using the private counter and the number.

20 Claims, 7 Drawing Sheets

Related U.S. Application Data continuation of application No. 14/133,591, filed on Dec. 18, 2013, now Pat. No. 8,930,274.

(60) Provisional application No. 61/897,520, filed on Oct. 30, 2013.

(51) Int. Cl.
    *G06Q 20/38*     (2012.01)
    *G06F 21/45*     (2013.01)
    *G06Q 20/32*     (2012.01)

(52) U.S. Cl.
    CPC ....... *G06Q 20/3278* (2013.01); *G06Q 20/385* (2013.01); *G06Q 20/40* (2013.01)

(58) Field of Classification Search
    USPC .......................................................... 726/6
    See application file for complete search history.

(56) References Cited

U.S. PATENT DOCUMENTS

| | | | |
|---|---|---|---|
| 6,237,095 B1 | 5/2001 | Curry et al. | |
| 6,745,936 B1 | 6/2004 | Movalli et al. | |
| 6,748,367 B1 | 6/2004 | Lee | |
| 6,850,916 B1 | 2/2005 | Wang | |
| 7,705,732 B2 | 4/2010 | Bishop et al. | |
| 7,735,725 B1 | 6/2010 | Bishop et al. | |
| 7,996,324 B2 | 8/2011 | Bishop et al. | |
| 8,010,451 B1 | 8/2011 | Nappi | |
| 8,151,345 B1 | 4/2012 | Yeager | |
| 8,930,274 B1 | 1/2015 | Brickell et al. | |
| 2002/0038288 A1 | 3/2002 | Scherzer | |
| 2002/0120584 A1 | 8/2002 | Hogan et al. | |
| 2002/0131601 A1 | 9/2002 | Ninomiya et al. | |
| 2003/0046534 A1 | 3/2003 | Alldredge | |
| 2003/0110136 A1 | 6/2003 | Wells et al. | |
| 2003/0126094 A1 | 7/2003 | Fisher et al. | |
| 2004/0139013 A1 | 7/2004 | Barbier et al. | |
| 2005/0156026 A1 | 7/2005 | Ghosh et al. | |
| 2006/0022033 A1 | 2/2006 | Smets et al. | |
| 2007/0228144 A1* | 10/2007 | Knackstedt ............ | G06Q 20/00 235/376 |
| 2007/0278291 A1 | 12/2007 | Rans et al. | |
| 2008/0040276 A1 | 2/2008 | Hammad et al. | |
| 2008/0320315 A1 | 12/2008 | Frey et al. | |
| 2009/0031410 A1 | 1/2009 | Schneider et al. | |
| 2009/0216680 A1 | 8/2009 | McCown et al. | |
| 2009/0307140 A1 | 12/2009 | Mardikar | |
| 2009/0307142 A1 | 12/2009 | Mardikar | |
| 2010/0089998 A1 | 4/2010 | Sandstrom et al. | |
| 2010/0252624 A1 | 10/2010 | Van de Velde et al. | |
| 2010/0262546 A1 | 10/2010 | Sahota et al. | |
| 2011/0004557 A1 | 1/2011 | Wang et al. | |
| 2011/0153496 A1 | 6/2011 | Royyuru | |
| 2011/0155800 A1 | 6/2011 | Mastrangelo et al. | |
| 2011/0161229 A1 | 6/2011 | Mastrangelo et al. | |
| 2011/0264580 A1 | 10/2011 | Smets et al. | |
| 2011/0270757 A1 | 11/2011 | Hammad | |
| 2012/0031969 A1 | 2/2012 | Hammad | |
| 2012/0089520 A1 | 4/2012 | Mardikar | |
| 2012/0089846 A1 | 4/2012 | Bleumer | |
| 2012/0095852 A1 | 4/2012 | Bauer et al. | |
| 2012/0143706 A1 | 6/2012 | Crake et al. | |
| 2012/0173432 A1 | 7/2012 | Yeager | |
| 2012/0215688 A1 | 8/2012 | Musser et al. | |
| 2012/0239928 A1 | 9/2012 | Judell | |
| 2012/0300938 A1 | 11/2012 | Kean et al. | |
| 2012/0330769 A1 | 12/2012 | Arceo | |
| 2013/0054417 A1 | 2/2013 | O'Donoghue et al. | |
| 2013/0054474 A1 | 2/2013 | Yeager | |
| 2013/0117185 A1 | 5/2013 | Collison et al. | |
| 2013/0117186 A1 | 5/2013 | Weinstein et al. | |
| 2013/0139230 A1 | 5/2013 | Koh et al. | |
| 2013/0151417 A1 | 6/2013 | Gupta | |
| 2013/0198086 A1 | 8/2013 | Mardikar | |
| 2013/0204781 A1 | 8/2013 | Flitcroft et al. | |
| 2013/0226791 A1 | 8/2013 | Springer et al. | |
| 2013/0238488 A1 | 9/2013 | Bouey et al. | |
| 2013/0262317 A1 | 10/2013 | Collinge et al. | |
| 2013/0266140 A1 | 10/2013 | Wall et al. | |
| 2013/0282502 A1 | 10/2013 | Jooste | |
| 2013/0291071 A1 | 10/2013 | Blom et al. | |
| 2015/0120556 A1 | 4/2015 | Brickell et al. | |

FOREIGN PATENT DOCUMENTS

| | | |
|---|---|---|
| KR | 10-2006-0076184 A | 7/2006 |
| KR | 10-2011-0138398 A | 12/2011 |
| WO | 2001/082246 A2 | 11/2001 |
| WO | 2004/008288 A2 | 1/2004 |
| WO | 2013/158419 A1 | 10/2013 |
| WO | 2015/065561 A1 | 5/2015 |

OTHER PUBLICATIONS

Chinese Patent Office, "Chinese Office Action issued in Chinese Application No. 201480060051.1", dated Nov. 23, 2017, 13 pages of English Translation and 10 pages of Chinese Office Action.

Roland, et al., "Cloning Credit Cards: A Combined Pre-Play and Downgrade Attack on EMV Contactless", Proceedings of the 7th USENIX conference on Offensive, Proceeding WOOT' 13, Aug. 13, 2013, pp. 1-12.

Bartley, "U.S. Office Action issued in copending U.S. Appl. No. 14/133,591, filed Dec. 18, 2013", dated Feb. 4, 2014, 20 pages.

Bartley, "U.S. Office Action issued in copending U.S. Appl. No. 14/469,560, filed Aug. 26, 2014", dated Dec. 26, 2014, 18 pages.

Bartley, "U.S. Office Action issued in copending U.S. Appl. No. 14/469,560, filed Aug. 26, 2014", dated May 26, 2015, 27 pages.

Bartley, "U.S. Office Action issued in copending U.S. Appl. No. 14/469,560, filed Aug. 26, 2014", dated Feb. 22, 2016, 6 pages.

Bartley, "U.S. Office Action issued in copending U.S. Appl. No. 14/469,560, filed Aug. 26, 2014", dated Jul. 25, 2016, 14 pages.

Biegelman, et al., "Executive Roadmap to Fraud Prevention and Internal Control: Creating a Culture of Compliance", XP055209832, Apr. 10, 2012, 3 pages.

Krafft, "European Office Action issued in European Application No. 14750299.1", dated Jul. 28, 2016, 11 pages.

Krafft, "Extended European Search Report issued in European Application No. 14750299.1", dated Sep. 25, 2015, 10 pages.

Kwon, "Korean Office Action issued in Korean Application No. 10-2016-7014270", dated Aug. 30, 2016, 8 pages of English Translation and 8 pages of Korean Office Action.

Langer, et al., "Anwendungen and Technik Von Near Field Communication (NFC)", Springer Berlin Heidelberg, Sep. 16, 2010, 146 pages.

Mayes, "Smart Cards, Tokens, Security and Applications", Jan. 7, 2008 (Jan. 7, 2008), Springer, XP055209227, 7 pages.

Nakamura, "International Preliminary Report on Patentability issued in International Application No. PCT/US2014/050451", dated May 12, 2016, 5 pages.

Park, "International Search Report and Written Opinion issued in International Application No. PCT/US2014/050451", dated Dec. 1, 2014, 11 pages.

Roland, et al., "Cloning Credit Cards: A Combined Pre-Play and Downgrade Attack on EMV Contactless", Proceedings of the 7th USENIX conference on Offensive Technologies, XP055209476, Aug. 13, 2013, 12 pages.

Smart Card Alliance, "RF-Enabled Applications and Technology: Comparing and Contrasting RFID and RF-Enabled Smart Cards", XP007906278, Jan. 2007, 7 pages.

Kwon, "Korean Office Action issued in Korean Application No. 10-2017-7009826", dated Dec. 19, 2017, 06 pages of English Translation and 06 pages of Korean Office Action.

Krafft, "European Office Action issued in European Application No. 14750299.1", dated Feb. 23, 2017, 10 pages.

(56) References Cited

OTHER PUBLICATIONS

"Chinese Office Action issued in Chinese Application No. 201480060051.1", dated Jun. 21, 2018, 9 pages of English Translation and 7 pages of Chinese Office Action.

* cited by examiner

420

```
510
┌─────────────────────────────────────────────────────────────┐
│ Application transmits request to account management system  │
│                 for new limited use ATCs                    │
└─────────────────────────────────────────────────────────────┘
                              ↓
520
┌─────────────────────────────────────────────────────────────┐
│           Account management system receives request        │
└─────────────────────────────────────────────────────────────┘
                              ↓
530
┌─────────────────────────────────────────────────────────────┐
│         Account management system identifies user account   │
└─────────────────────────────────────────────────────────────┘
                              ↓
540
┌─────────────────────────────────────────────────────────────┐
│  Account management system creates and logs new bundle of   │
│                    limited use private ATCs                 │
└─────────────────────────────────────────────────────────────┘
                              ↓
550
┌─────────────────────────────────────────────────────────────┐
│    Account management system creates and logs new bundle    │
│            of corresponding limited use public ATCs         │
└─────────────────────────────────────────────────────────────┘
                              ↓
560
┌─────────────────────────────────────────────────────────────┐
│ Account management system transmits bundle of limited use   │
│   public ATCs and corresponding private ATCs to user device │
└─────────────────────────────────────────────────────────────┘
                              ↓
570
┌─────────────────────────────────────────────────────────────┐
│    User device receives bundle of limited use public ATCs   │
│               and corresponding private ATCs                │
└─────────────────────────────────────────────────────────────┘
                              ↓
580
┌─────────────────────────────────────────────────────────────┐
│  User device saves bundle of limited use public ATCs and    │
│                corresponding private ATCs                   │
└─────────────────────────────────────────────────────────────┘
                              ↓
                         ( 430, Fig. 4 )
```

```
610
┌─────────────────────────────────────────────────────────────────┐
│ Terminal reader transmits financial account information, CVC3,  │
│ and public ATC to POS terminal                                  │
└─────────────────────────────────────────────────────────────────┘
                              ↓
615
┌─────────────────────────────────────────────────────────────────┐
│ POS terminal receives financial account information, CVC3, and  │
│ public ATC                                                       │
└─────────────────────────────────────────────────────────────────┘
                              ↓
620
┌─────────────────────────────────────────────────────────────────┐
│ POS terminal transmits financial account information, CVC3,     │
│ and public ATC to acquirer system                               │
└─────────────────────────────────────────────────────────────────┘
                              ↓
625
┌─────────────────────────────────────────────────────────────────┐
│ Acquirer system receives financial account information, CVC3,   │
│ and public ATC                                                   │
└─────────────────────────────────────────────────────────────────┘
                              ↓
630
┌─────────────────────────────────────────────────────────────────┐
│ Acquirer system transmits financial account information, CVC3,  │
│ and public ATC to account management system                     │
└─────────────────────────────────────────────────────────────────┘
                              ↓
635
┌─────────────────────────────────────────────────────────────────┐
│ Account management system receives financial account            │
│ information, CVC3, and public ATC                               │
└─────────────────────────────────────────────────────────────────┘
                              ↓
640
┌─────────────────────────────────────────────────────────────────┐
│ Account management system identifies user account that          │
│ corresponds to financial account information received           │
└─────────────────────────────────────────────────────────────────┘
                              ↓
                         650 ⟨Public ATC correct and not expired?⟩ ──No──→ 655 Transaction declined
                              │ Yes
                         660 ⟨CVC3 correct?⟩ ──No──────────────────────→ (to 655)
                              │ Yes
670
┌─────────────────────────────────────────────────────────────────┐
│ Account management system retrieves saved financial account     │
│ information that corresponds to the received financial          │
│ information                                                      │
└─────────────────────────────────────────────────────────────────┘
                              ↓
680
┌─────────────────────────────────────────────────────────────────┐
│ Account management system requests payment authorization from   │
│ issuer system for transaction using retrieved financial         │
│ account information                                              │
└─────────────────────────────────────────────────────────────────┘
                              ↓
                         690 ⟨Approved?⟩ ──No──→ 655 Transaction declined
                              │ Yes
                         695 Transaction approved
```

SECURE INTERFACE USING NON-SECURE ELEMENT PROCESSORS

CROSS-REFERENCE TO RELATED APPLICATIONS

This application is a continuation of and claims priority to U.S. patent application Ser. No. 14/469,560, filed Aug. 26, 2014 and entitled "Securing Payment Transactions with Rotating Application Transaction Counters," which is a continuation of and claims priority to U.S. patent application Ser. No. 14/133,591, filed Dec. 18, 2013 and entitled "Securing Payment Transactions with Rotating Application Transaction Counters," which claims priority to U.S. Provisional Application No. 61/897,520, filed Oct. 30, 2013 and entitled "Securing Payment Transactions with Rotating Application Transaction Counters." The entire disclosures of the above-identified priority applications are hereby fully incorporated herein by reference.

TECHNICAL FIELD

The present disclosure relates generally to non-secure element processors, and more particularly to securing the interface between non-secure element processors and other systems.

BACKGROUND

Current near field communication (NFC) systems rely on a hardware component commonly referred to as a "secure element" or a "secure memory" installed on communication devices to provide a secure operating environment for identification and authentication, physical security access, and other secure functions. A secure element generally includes its own operating environment with a tamper-proof microprocessor, memory, and operating system. An NFC controller receives a request message from a third party system and transmits the message to the secure element for processing. A trusted service manager (TSM), or other form of secure service provider, can, among other things, install, provision, and personalize applications and data in the secure element. The secure element has one or more access keys that are typically installed at time of manufacture. A corresponding key is shared with the TSM so that the TSM can establish a cryptographically secure channel to the secure element for installation, provisioning, and personalization of the secure element while the device having the secure element is in the possession of an end user. In this way, the secure element can remain secure even if the host CPU in the device has been compromised.

One deficiency with current NFC systems is that a tight coupling exists between the secure element and the TSM. For current deployments, only one TSM has access to the keys of a particular secure element. Therefore, the end user can choose to provision secure element features that are supplied by the one TSM only. The manufacturer of the device typically chooses this TSM. For example, a smart phone manufacturer may select the TSM for smart phones under guidance from a mobile network operator (MNO), such as Phone Company A, that purchases the smart phone, rather than the end user. Thus, the TSM features available to the end user may not be in the end user's interest. As an example, the MNO may have a business relationship with only one service provider, such as Company X. That TSM may allow the secure element to be provisioned with processing instructions from the one service provider only. Thus, the end user would not be able to access services from other service providers, such as Company Z.

SUMMARY

In certain example aspects described herein, methods for secure interfaces comprise public and private counters. A bundle of public counters and a corresponding bundle of private counters are created and transmitted to a user device. The user device receives a request and processes the request without accessing a secure element processor on the user device. The user device generates a security code using one of the private counters and a number. The user device transmits the calculated security code and one of the public counters in response to the request. A receiver of the response determines the validity of the public counter and looks up the corresponding private counter using the public counter. The receiver determines the validity of the security code by recomputing it using the private counter and the number.

In certain other aspects described herein, systems and computer program products for secure interfaces are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 5 is a block flow diagram depicting a method for providing new limited use application transaction counters to a user device, in accordance with certain example embodiments.

FIG. 6 is a block flow diagram depicting a method for approving requests using a public application transaction counter and a calculated dynamic verification code, in accordance with certain example embodiments.

DETAILED DESCRIPTION OF THE EXAMPLE EMBODIMENTS

Overview

Figure 1:
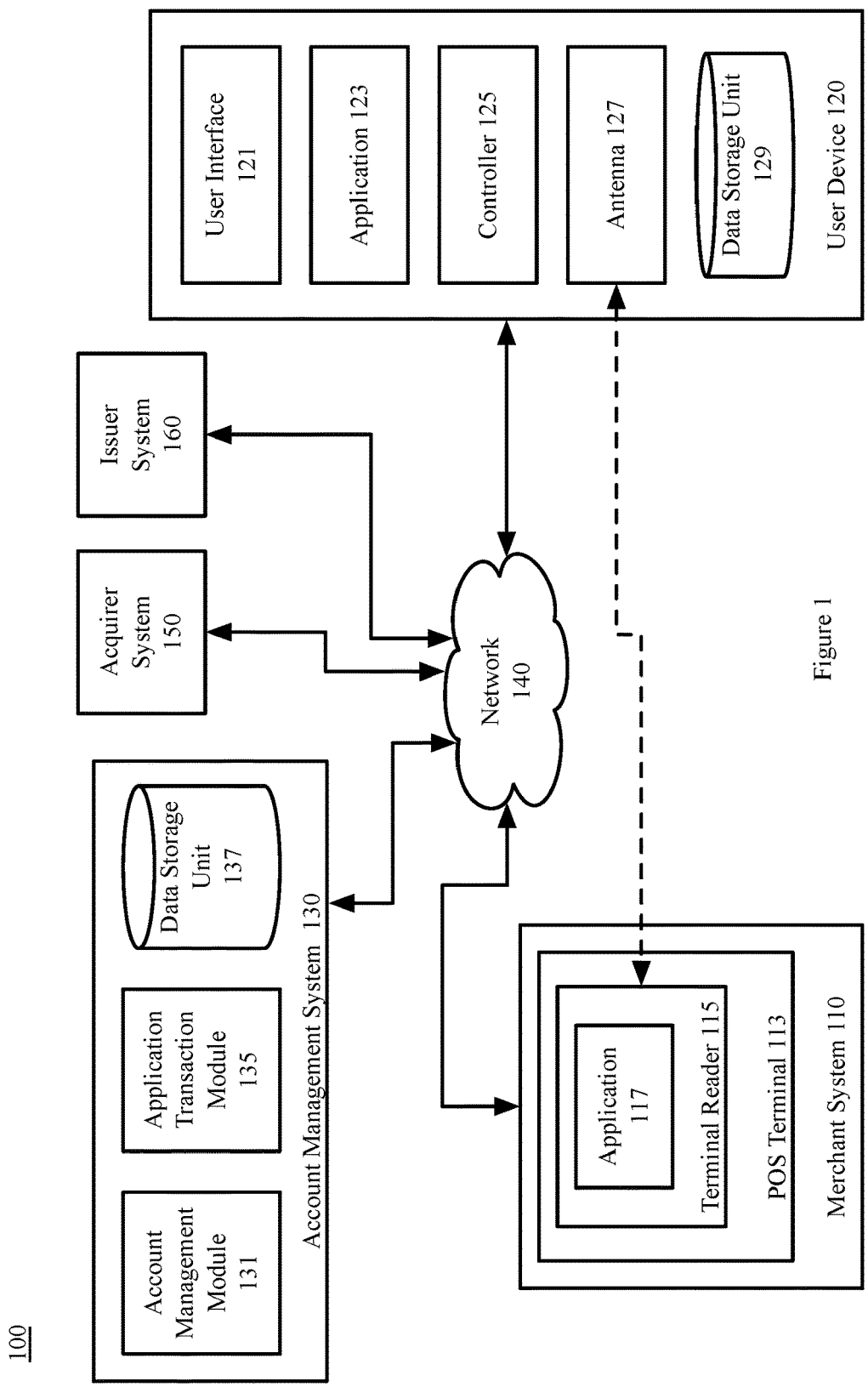
FIG. 1 is a block diagram depicting a request processing system, in accordance with certain example embodiments.

The example embodiments described herein provide methods and systems that enable processing of a payment transaction without accessing a secure element of a user device. In an example embodiment, a user is conducting a wireless payment transaction with a merchant system by transmitting payment information from the user device to a terminal reader. The secure element resident on the user device may be tightly coupled to a TSM at the time of manufacturer, thereby preventing the user from providing payment instructions for a payment account not provisioned on the secure element. In an example embodiment, the user device comprises an application and application transaction counters (ATCs) that permit the secure processing of the payment transaction without accessing the secure element.

A user registers with an application management system and provides financial account information that will be maintained in a user account with the account management system. The account management system creates limited use proxy or virtual financial account information that corresponds to the user's financial account information provided to the system. The account management system also creates a set of public and corresponding private ATCs. In an example embodiment, the ATCs are limited in time and in number of uses. For example, each public/private ATC may be used once, so once the bundle of ATCs transmitted to the user device are used, the user device must request a new bundle before a new transaction can be processed. The account management system transmits the limited use financial account information and the limited use ATCs to the user device.

When the user requests processing of a financial transaction using the limited use financial account information, the merchant system transmits a payment request and an unpredictable number or code to the user device. The user device uses the unpredictable number and one of the bundle of private ATCs, which is known only to the user device and the account management system, to calculate a security code. The security code, the limited use financial account information, and the corresponding public ATC are transmitted to the merchant system. The merchant system prepares and transmits a request to the account management system for processing the payment transaction using the limited use financial account information. In an example embodiment, the request comprises the limited use financial account information, the public ATC, the calculated security code, and the unpredictable number.

The account management system receives the payment request and determines that the public ATC is from the available bundle of private ATCs transmitted to the user device and that the public ATC is not expired. The account management system then uses the public ATC to look up and retrieve the private ATC. The account management system uses the retrieved private ATC and the unpredictable number to recomputed the security code. The account management system compares the calculated security code received in the payment request to the recomputed security code to determine the validity of the code received in the payment request. After performing these security checks, the account management system retrieves the user's financial account information and requests payment processing from the issuer of the account. The merchant system is notified of the payment request approval or denial and the payment transaction is completed.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting a payment processing system, in accordance with certain example embodiments. As depicted in FIG. 1, the exemplary operating environment 100 comprises a merchant computing system 110, a user computing device 120, an account management computing system 130, an acquirer computing system 150, and an issuer computing system 160 that are configured to communicate with one another via one or more networks 140. In another example embodiment, two or more of these systems (including systems 110, 120, 130, 150, and 160) are integrated into the same system. In some embodiments, a user associated with a device must install an application and/or make a feature selection to obtain the benefits of the techniques described herein.

Each network 140 includes a wired or wireless telecommunication means by which network systems (including systems 110, 120, 130, 150, and 160) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network computing system (including systems 110, 120, 130, 150, and 160) includes a device having a communication module capable of transmitting and receiving data over the network 140. For example, each network system (including systems 110, 120, 130, 150, and 160) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, 130, 150, and 160) are operated by merchants, users, an account management system operator, an acquirer, and an issuer, respectively.

The merchant system 110 comprises at least one point of sale (POS) terminal 113 that is capable of processing a purchase transaction initiated by a user, for example, a cash register. In an example embodiment, the merchant operates a commercial store and the user indicates a desire to make a purchase by presenting a form of payment at the POS terminal 113. In another example embodiment, the merchant operates an online store and the user indicates a desire to make a purchase by clicking a link or "checkout" button on a website. In another example embodiment, the user device 120 is configured to perform the functions of the POS terminal 113. In this example, the user scans and/or pays for the transaction via the user device 120 without interacting with the POS terminal 113.

An example merchant system 110 comprises at least a terminal reader 115 that is capable of communicating with the user device system 120 and a merchant POS terminal 113 via an application 117. The application 117 may be an integrated part of the POS terminal 113, an integrated part of the terminal reader 115, or a standalone hardware device (not shown), in accordance with some example embodiments.

In an example embodiment, the terminal reader 115 is capable of communicating with the user device 120 using an NFC communication method. In another example embodiment, the terminal reader 115 is capable of communicating with the user device 120 using a Bluetooth communication method. In yet another embodiment, the terminal reader 115 is capable of communicating with the user device 120 using a Wi-Fi communication method.

In an example embodiment, the merchant system 110 is capable of communicating with the user device 120 via the terminal reader 115 and/or the application 117. In an example embodiment, the user device 120 may be a personal computer, mobile device (for example, notebook, computer, tablet computer, netbook computer, personal digital assistant (PDA), video game device, GPS locator device, cellular telephone, Smartphone or other mobile device), or other appropriate technology that includes or is coupled to a web server, or other suitable application. The user can use the user device 120 to process payment transactions via a user interface 121 and an application 123. The application 123 is a program, function, routine, applet or similar entity that exists on and performs its operations on the user device 120. For example, the application 123 may be one or more of a shopping application, merchant system 110 application, an Internet browser, a digital wallet application, a loyalty card application, another value-added application, a user interface 121 application, or other suitable application operating on the user device 120. In some embodiments, the user must install an application 123 and/or make a feature selection on the user device 120 to obtain the benefits of the techniques described herein.

The user device 120 also comprises a controller 125. In an example embodiment, the controller 125 is an NFC controller. In some example embodiments, the controller 125 is a Bluetooth link controller. The Bluetooth link controller may be capable of sending and receiving data, performing authentication and ciphering functions, and directing how the user device 120 will listen for transmissions from the terminal reader 115 or configure the user device 120 into various power-save modes according to the Bluetooth-specified procedures. In another example embodiment, the controller 125 is a Wi-Fi controller or an NFC controller capable of performing similar functions.

The user device 120 communicates with the terminal reader 115 via an antenna 127. In an example embodiment, once a user device application 123 has been activated and prioritized, the controller 125 is notified of the state of readiness of the user device 120 for a transaction. The controller 125 outputs through the antenna 127 a radio signal, or listens for radio signals from the terminal reader 115. On establishing a secure communication channel between the user device 120 and the terminal reader 115, the terminal reader 115 requests a payment processing response from the user device 120. An example controller 125 receives a radio wave communication signal from the terminal reader 115 transmitted through the antenna 127. The controller 125 converts the signal to readable bytes. In an example embodiment, the bytes comprise digital information, such as a request for a payment processing response or a request for payment card information. The controller 125 transmits the request to the application 123 for processing.

An example user device 120 may comprise a secure element or secure memory (not shown), which can exist within a removable smart chip or a secure digital (SD) card or which can be embedded within a fixed chip on the device 120. In certain example embodiments, Subscriber Identity Module (SIM) cards may be capable of hosting a secure element, for example, an NFC SIM Card. The secure element (not shown) allows a software application resident on the user device 120 and accessible by the device user to interact securely with certain functions within the secure element, while protecting information stored within the secure element (not shown). In an example embodiment, the secure element (not shown) comprises components typical of a smart card, such as crypto processors and random generators. In an example embodiment, the secure element (not shown) comprises a Smart MX type NFC controller in a highly secure system on a chip controlled by a smart card operating system, such as a JavaCard Open Platform (JCOP) operating system. In another example embodiment, the secure element (not shown) is configured to include a non-EMV type contactless smart card, as an optional implementation. The secure element (not shown) communicates with the application in the user device 120. In an example embodiment, the secure element (not shown) is capable of storing encrypted user information and only allowing trusted applications to access the stored information. In an example embodiment, a controller 125 interacts with a secure key encrypted application for decryption and installation in the secure element.

In an example user device 120, a payment request is processed by the application 123, instead of by a secure element (not shown). In an example embodiment, the user device 120 communicates payment account information to the merchant system 110 in the form of a proxy or virtual account identifier, without transmitting the user's actual financial account information. The user's actual account information is maintained by the account management system 130 instead of within a secure element (not shown) resident on the user device 120.

An example data storage unit 129 enables storage of user payment account information and/or virtual account identifier for the user's account management system 130 account. In an example embodiment, the data storage unit 129 can include any local or remote data storage structure accessible to the user device 120 suitable for storing information. In an example embodiment, the data storage unit 129 stores encrypted information, such as HTML5 local storage.

An example user device 120 communicates an account identifier to the merchant system 110 that identifies an account maintained by the account management system 130. An example account management system 130 comprises an account management module 131, an application transaction module 135 and a data storage unit 137.

The account management system 130 enables the storage of one or more financial or payment accounts for the user. In an example embodiment, the user registers one or more payment accounts, for example, credit card accounts, debit accounts, bank accounts, gift card accounts, coupons, stored value accounts, loyalty accounts, rewards accounts, and other forms of payment accounts capable of making a purchase with the account management system 130. For example, the user may create a digital wallet account with the account management system 130. The payment accounts may be associated with the user's digital wallet account maintained by the account management system 130. The user may access the digital wallet account at any time to add, change or remove payment accounts. In an example embodiment, the user's digital wallet information is transmitted to the user's user device 120, enabling use of the user's payment account without accessing the account management system 130. In some example embodiments, the account management system 130 transmits limited-use proxy account information to the user device 120 enabling use of the payment accounts during a payment transaction routed to the account management system 130 during the payment processing. For example, the proxy account number may route the payment authorization request to the account management system 130, acting as the issuer system 160 for the proxy account. In another example embodiment, the user device 120 may generate limited use proxy account numbers that are enable the payment transaction to be routed to the account management system 130. In some example embodiments, the application 123 performs this function.

An example account management system 130 comprises a data storage unit 137 accessible by the account management system 130. The example data storage unit 137 can include one or more tangible computer-readable storage devices capable of storing a user's payment account information. The user may request a purchase from the merchant system 110. In an example embodiment, the purchase is initiated by a wireless "tap" of the user device 120 with the terminal reader 115. The merchant system 110 interacts with the acquirer system 150 (for example Acquirer Payment System Q or other third party payment processing companies) and the issuer system 160 (for example Bank X or other financial institutions to authorize payment) to process the payment. In some example embodiments, the payment card information transmitted by the user device 120 to the terminal reader 115 is a proxy account or a token account that links the payment transaction to a user account maintained by the account management system 130. The payment transaction is routed to the account management system 130 as the issuer system 160 for the proxy account for identification of the user's correct payment card information. In an example embodiment, the application transaction module 135 receives the payment request from the merchant system 110 and interacts with the account management module 131 to identify the user's account management system 130 account and process a payment request to the issuer system 160 of the user's financial account.

The components of the example operating environment 100 are described hereinafter with reference to the example methods illustrated in FIGS. 2-6. The example methods of FIG. 2-6 may also be performed with other systems and in other environments.

Example System Processes

Figure 2:
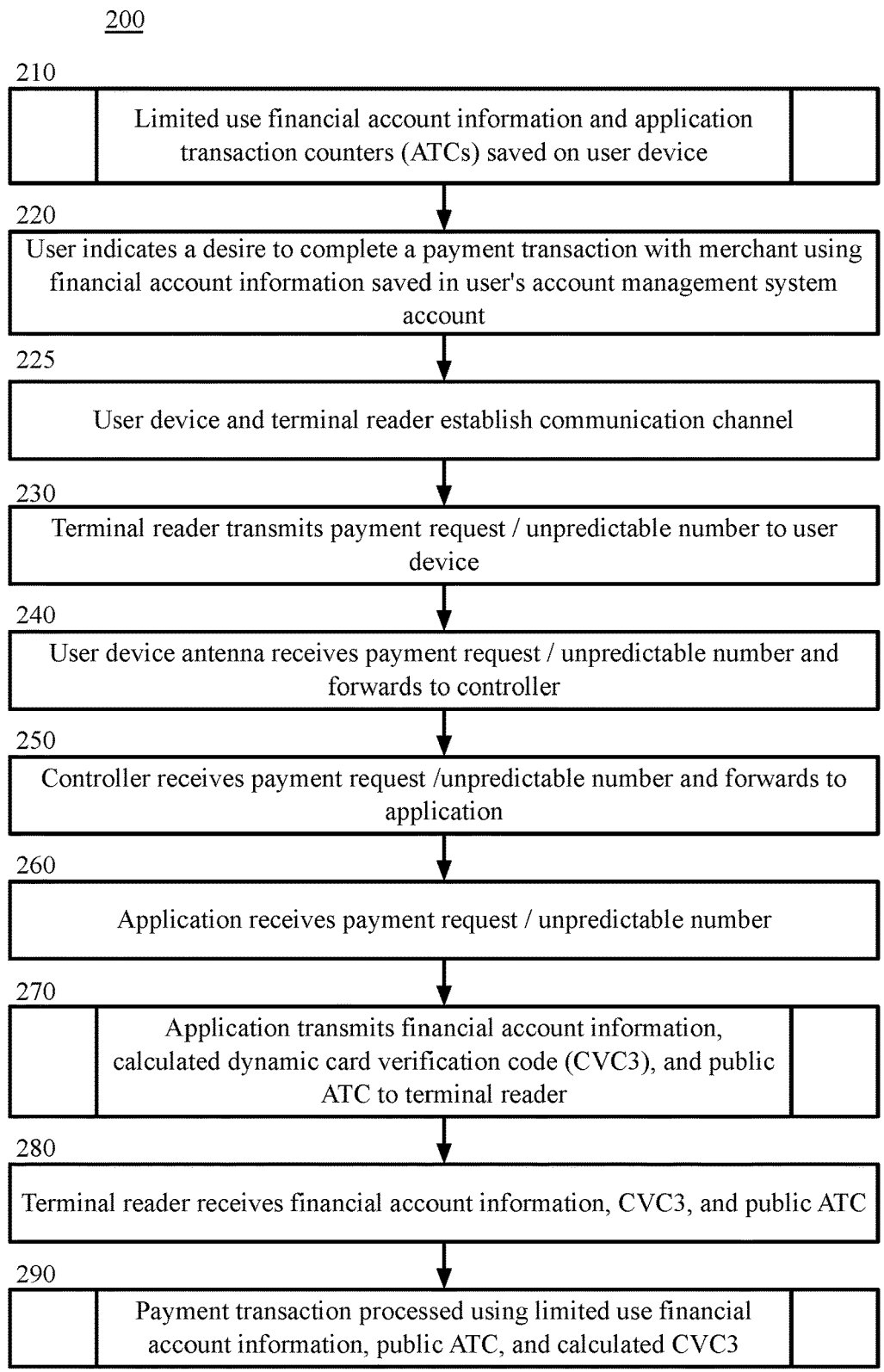
FIG. 2 is a block flow diagram depicting a method for processing requests using application transaction counters, in accordance with certain example embodiments.

FIG. 2 is a block flow diagram depicting a method for processing payment transactions using limited use financial account information and application transaction counters, in accordance with certain example embodiments. The method 200 is described with reference to the components illustrated in FIG. 1.

In block 210, limited use financial account information and application transaction counters (ATCs) are saved on a user device 120. The method for saving limited use financial account information and application transaction counters on a user device is described in more detail hereinafter with reference to the methods described in FIG. 3.

Figure 3:
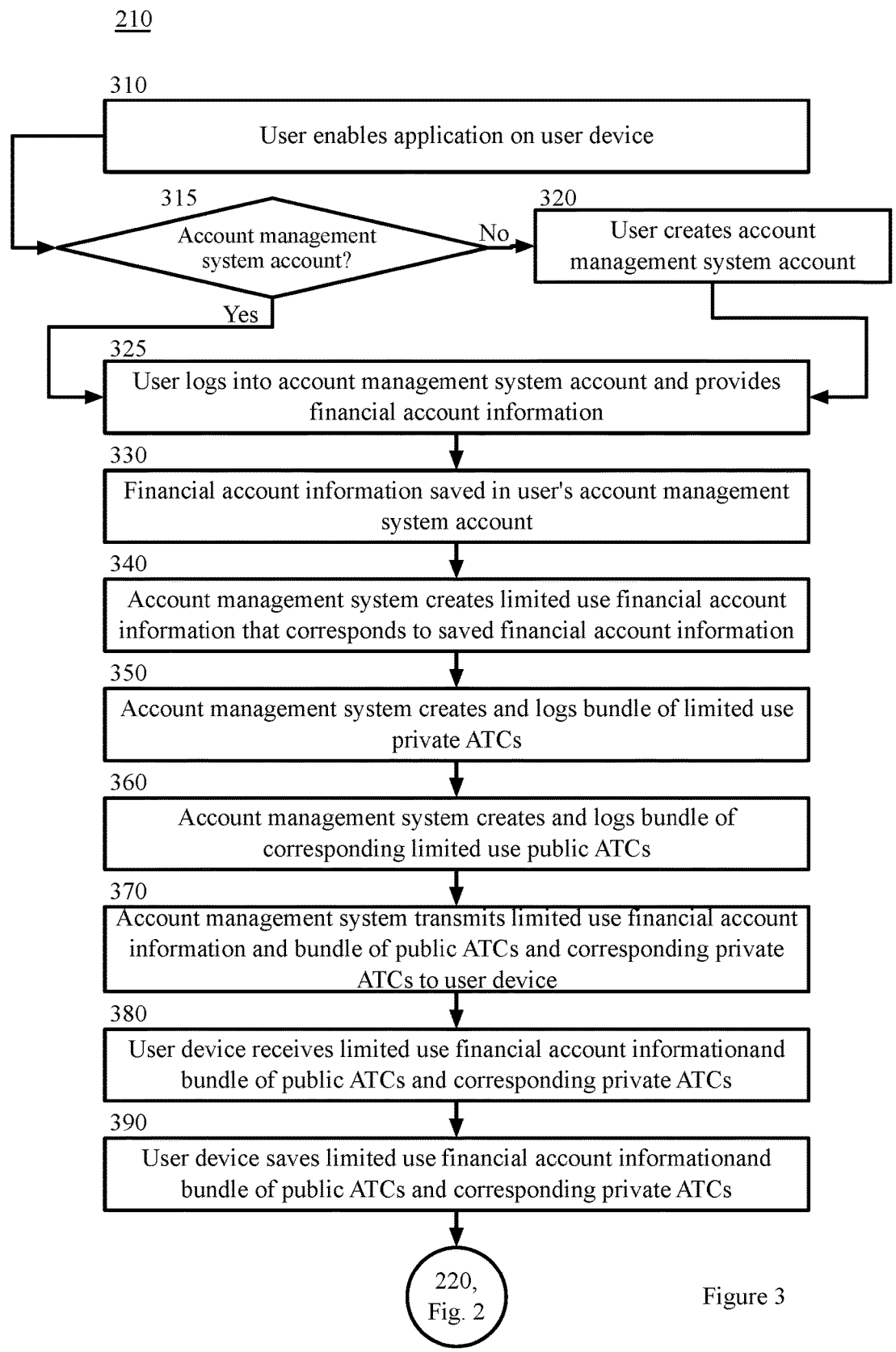
FIG. 3 is a block flow diagram depicting a method for saving application transaction counters on a user device, in accordance with certain example embodiments.

FIG. 3 is a block flow diagram depicting a method 210 for saving limited use financial account information and application transaction counters on a user device, in accordance with certain example embodiments, as referenced in block 210. The method 210 is described with reference to the components illustrated in FIG. 1.

In block 310, a user installs, downloads, or otherwise enables a payment processing, digital wallet, or other financial transaction application 123 on the user device 120. In an example embodiment, once the user enables the application 123 on the user device 120, the user device becomes an "authorized" user device 120. In this embodiment, an authorized user device 120 is capable of processing a payment transaction, communicating with an account management system 130, and performing the features described herein. In this embodiment, the user device 120 receives limited use financial account information and ATCs to perform the methods described herein. In an example embodiment, the user can enable the application 123 on more than one user device 120. In this embodiment, each user device 120 may possess the same or different limited use financial account information and/or ATCs for use in processing payment transaction.

In another example embodiment, the user can disable or uninstall the application 123 at any time and on any number of previously authorized user devices 120. In this embodiment, the limited use financial account information and/or ATCs are removed from the device or otherwise rendered disabled for processing payment transactions.

In block 315, the account management system 130 receives notification that the user has enabled the application on the user device 120 and determines whether the user has an account management system 130 account. In an example embodiment, the user is prompted to provide account management system 130 account identification information or log into the user's account management system 130 account when the application 123 is enabled. In another example embodiment, the user previously logged into the account management system 130 account and is otherwise automatically logged into the account. In yet another example embodiment, the user's login credentials are shared across other accounts (for example, social networking websites and user device 120 accounts) and the user is automatically logged into the account management system 130 account using the shared login credentials.

If the user does not have an account management system 130 account, the method 210 proceeds to block 230 and the user is prompted to create an account management system 130 account. In an example, the user is prompted to register with the account management system 130 when the user enables the application 123. In another example embodiment, the user is not required to log in or register for the account management system 130 account. In this embodiment, the methods described herein are performed for a "guest" user.

In situations in which the technology discussed here collects personal information about the user, or may make use of personal information, the user may be provided with a opportunity to control whether programs or features collect user information (for example, information about the user's purchases, social network, social actions or activities, profession, a user's preferences, or a user's current location), or to control whether and/or how to receive content from the user device 120 and/or account management system 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of the user cannot be determined. Thus, the user may have control over how information is collected about the user and used by the account management system 130.

In an example embodiment, the user may create the account management system 130 account at any time prior to or while enabling the application 123. In an example embodiment, the user accesses the account management system 130 via a website and the network 140. In an example embodiment, the user submits registration information to the account management system 130, including, but not limited to, name, address, phone number, e-mail address, and information for one or more registered financial card accounts, including bank account debit cards, credit cards, a loyalty rewards account card, or other type of account that can be used to make a purchase (for example, card type, card number, expiration date, security code, and billing address). In an example embodiment, the user's account management system 130 account information is saved in the data storage unit 137 and is accessible to the account management module 131 and application transaction module 135. In another example embodiment, the user is not required to log into and/or maintain an account management system 130 account.

In an example embodiment, the account management system 130 account is a digital wallet account maintained by the account management system 130 or a third party system. In another example embodiment, the user may use a smart phone application 123 to register with the account management system 130. In yet another example embodiment, the user accesses the account management system 130 via a smart phone application 123.

From block 320, the method 210 proceeds to block 325 in FIG. 3.

Returning to block 315 in FIG. 3, if the user has an account management system 130 account, the user logs into the account in block 325. In an example embodiment, the user's account management system 130 account information is saved in the user device 120 and the user is automatically signed into the user's account management system 130 account. In another example embodiment, the user is automatically logged into the account management system 130 account using shared login credentials. In yet another example embodiment, the user was previously logged into the account management system 130 account and is not required to login.

The user enters financial account information (for example, credit account, debit account, bank account, stored value account, loyalty account, gift account, or other account capable of paying for a purchase) on the user device 120. In an example embodiment, the user accesses an application 123 on the user device 120 and enters the financial account information. In an example embodiment, the user enters the financial account number, expiration date, card verification number, name of the account, name of the user, and any additional information required to process a financial transaction.

In block 330, the financial account information entered by the user is saved in the user's account management system 130 account. In an example embodiment, the financial account information saved in the user's account management system 130 account can be accessed, changed, updated, and/or deleted at any time. In an example embodiment, the financial account information is saved in the data storage unit 137.

In block 340, the account management system 130 creates limited use financial account information that corresponds to the saved financial account information. In an example embodiment, the limited use financial account information is a proxy account identifier or account management system identifier. In this embodiment, the account management system 130 functions as the issuer system 160 of the financial account information and receives a payment request from a merchant system 110 when the limited use financial account information is used in a payment transaction.

In an example embodiment, the account management system 130 creates a single set of limited use financial account information that is linked to each of the one or more financial accounts saved in the user's account. In another example embodiment, the account management system 130 creates two or more sets of limited use financial account information and the application 123 on the user device 120 determines which set of limited financial account information to provide to the merchant system 110 during the payment transaction. In an example embodiment, the user selects a default financial account to be used for processing payment transactions. In an alternative example embodiment, the user defines rules understandable by the account management system 130 and/or the application 123 for determining which financial account is used to process financial transaction at various merchants.

In an example embodiment, the limited use financial account information is valid for a limited duration. In this embodiment, new limited use financial account information is created at pre-defined intervals (for example, after 24 hours expires) or upon a triggering event (for example, after 10 transactions are processed).

In block 350, the account management system 130 creates and logs a bundle of limited use private ATCs. In an example embodiment, the account management system 130 creates a bundle or set of private ATCs that are limited in duration (for example, they expire after 24 hours) and/or number (for example, 10 ATCs are created for 10 transactions). In an example embodiment, the private ATCs are known only to the account management system 130 and the user device 120. In this embodiment, the user device 120 uses the private ATCs to calculate a security code or dynamic card verification number (for example, a CVC3 checksum).

In an example embodiment, the private ATCs are randomly chosen numbers or values that do not repeat until each possible value in the set of possible numbers has been used. For example, each private ATC may be a value between 0000 and 9999. In an example embodiment, a set amount of private ATCs are valid during any given interval. For example, 10 private ATCs may be value in each 24-hour period, and each private ATC is valid for only 1 transaction. In an example embodiment, the private ATC values are not incremental, but randomly chosen values. In another example embodiment, a single private ATC value is created for each limited use financial account number.

In block 360, the account management system creates and logs a corresponding bundle of public ATCs. In an example embodiment, each private ATC has a corresponding public ATC. In an example embodiment, the account management system 130 creates a bundle or set of public ATCs that are limited in duration (for example, they expire after 24 hours) and/or number (for example, 10 ATCs are created for 10 transactions). In an example embodiment, the public ATCs are known to the account management system 130, the user device 120, and the merchant system 110 during a payment transaction. In this embodiment, the user device 120 transmits a public ATC to the merchant system 110 with the limited use financial account information.

In an example embodiment, the public ATCs are randomly chosen numbers or values that do not repeat until each possible value in the set of possible numbers has been used. For example, each public ATC may be a value between 0000 and 9999. In an example embodiment, a set amount of public ATCs are valid during any given interval. For example, 10 public ATCs may be value in each 24-hour period, and each public ATC is valid for only 1 transaction. In an example embodiment, the public ATC values are not incremental, but randomly chosen values.

In block 370, the account management system 130 transmits the limited use financial account information, the bundle of public ATCs, and the corresponding bundle of private ATCs to the user device 120. In an example embodiment, the information is replicated on each authorized user device 120. In another example embodiment, a new set of information is created and transmitted to each authorized user device 120. In an example embodiment, new information is created at pre-defined intervals (for example, every 24 hours) and is created upon request by the user device 120. In another example embodiment, new information is created after the previous information has expired or is no longer available (for example, after the maximum number of transaction has been reached or each of ATCs has been used).

In block 380, the user device 120 receives the limited use financial account information, the bundle of public ATCs, and the corresponding bundle of private ATCs.

In block 390, the user device 120 saves the limited use financial account information, the bundle of public ATCs, and the corresponding bundle of private ATCs. In an example embodiment, the information is saved in the data storage unit 129 and is accessible by the application 123 for processing a payment transaction with the merchant system 110.

The method 210 then proceeds to block 220 in FIG. 2.

Returning to FIG. 2, in block 220, the user indicates a desire to complete a payment transaction with the merchant system 110 using the financial account information saved in the user's account management system 130 account. In an example embodiment, the user indicates the desire by using the limited use financial account information for processing.

In an example embodiment, the user accesses the application 123 on the user device 120. In an example embodiment, the application 123 is a merchant shopping application 123 or other application/website that enables the user to perform an electronic financial transaction. In another example embodiment, the user accesses a payment processing application 123 that enables the user to wirelessly transmit financial account information to the terminal reader 115. In this embodiment, the financial account information is transmitted via a secure communication channel (for example, near field communications, Bluetooth, Wi-Fi, or other form of wireless communication channel).

In an example embodiment, the user taps the user device 120 in the proximity of the terminal reader 115. In an example embodiment, the terminal reader 115 generates a radio frequency (RF) or other field polling for the presence of a user device 120, and the user "taps" the user device 120 by placing the device 120 within the field of the terminal reader 115. In some example embodiments, the merchant activates the RF field or other field to poll for the presence of a user device 120 using an application 117 on the terminal reader 115.

In block 225, the user device 120 and the terminal reader 115 establish a secure communication channel. In an example embodiment, the communication channel is an NFC communication channel. In some example embodiments, the communication channel is a Bluetooth communication channel. In yet another example embodiment, the communication channel is a Wi-Fi communication channel. Accordingly, the payment transaction can be conducted via wireless or "contactless" communication between the user device 120 and the terminal reader 115.

In an example embodiment, the terminal reader 115 requests protocols and characteristics from the user device 120 to establish the communication channel. For example, the terminal reader 115 may request the identification of communication protocols (for instance ISO/IEC 14443, MIFARE, and/or ISO/IEC 18092), a list of applications available, and security protocols from the user device 120.

In an example embodiment, the terminal reader 115 transmits a signal requesting a payment processing response to the user device 120. In an example embodiment, the response is a request to proceed with a financial payment transaction. In an example embodiment, the response indicates to the terminal reader 115 that the user device 120 is capable of performing a financial transaction. In an example embodiment, the response comprises the same language and/or information as a payment processing response generated by a conventional secure element or secure memory.

In block 230, the terminal reader 115 transmits a payment request to the user device 120. In an example embodiment, the payment request comprises an unpredictable number. In an example embodiment, the unpredictable number is a randomly generated number that will be used by the user device 120 to calculate a security code or CVC3 number. In another example embodiment, the unpredictable number comprises a transaction number or other number known by the merchant system 110 and/or transmitted to the account management system 130 in a request for payment authorization.

In an example embodiment, the application 117 resident on the merchant system 110 generates the payment request. In an example embodiment, the request is converted to a signal capable of being transmitted to the user device 120 via the communication channel and converted into bytes understandable by the application 123.

In block 240, the antenna 127 of the user device 120 receives the payment request. In an example embodiment, the payment request is transmitted via the communication channel and during the "tap" of the user device 120 with the terminal reader 115.

In an example embodiment, the antenna 127 transmits the payment request to the controller 125. In an example embodiment, the tap is an NFC tap and the controller 125 is an NFC controller.

In block 250, the controller 125 receives the payment request and transmits it to the application 123. In an example embodiment, the controller 125 converts the signal received by the antenna 127 into a readable payment request. In an example embodiment, the signal is converted into bytes comprising the readable request.

In an example embodiment, the controller 125 transmits the payment request to the application 123. In an example embodiment, the application 123 functions in a manner similar to a secure element or a secure memory during the payment transaction by retrieving stored payment information and providing it to the terminal reader 115 for processing a payment transaction.

In block 260, the application 123 receives the payment request. In an example embodiment, the request is transmitted through a series of connections before being received by the application 123. In some example embodiments, the request is transmitted directly from the controller 125 to the application 123.

In block 270, the application 123 transmits the limited use financial account information, a calculated CVC3, and a public ATC to the terminal reader. The method for transmitting limited use financial account information, a calculated CVC3, and a public application transaction counter to a terminal reader is described in more detail hereinafter with reference to the methods described in FIG. 4.

Figure 4:
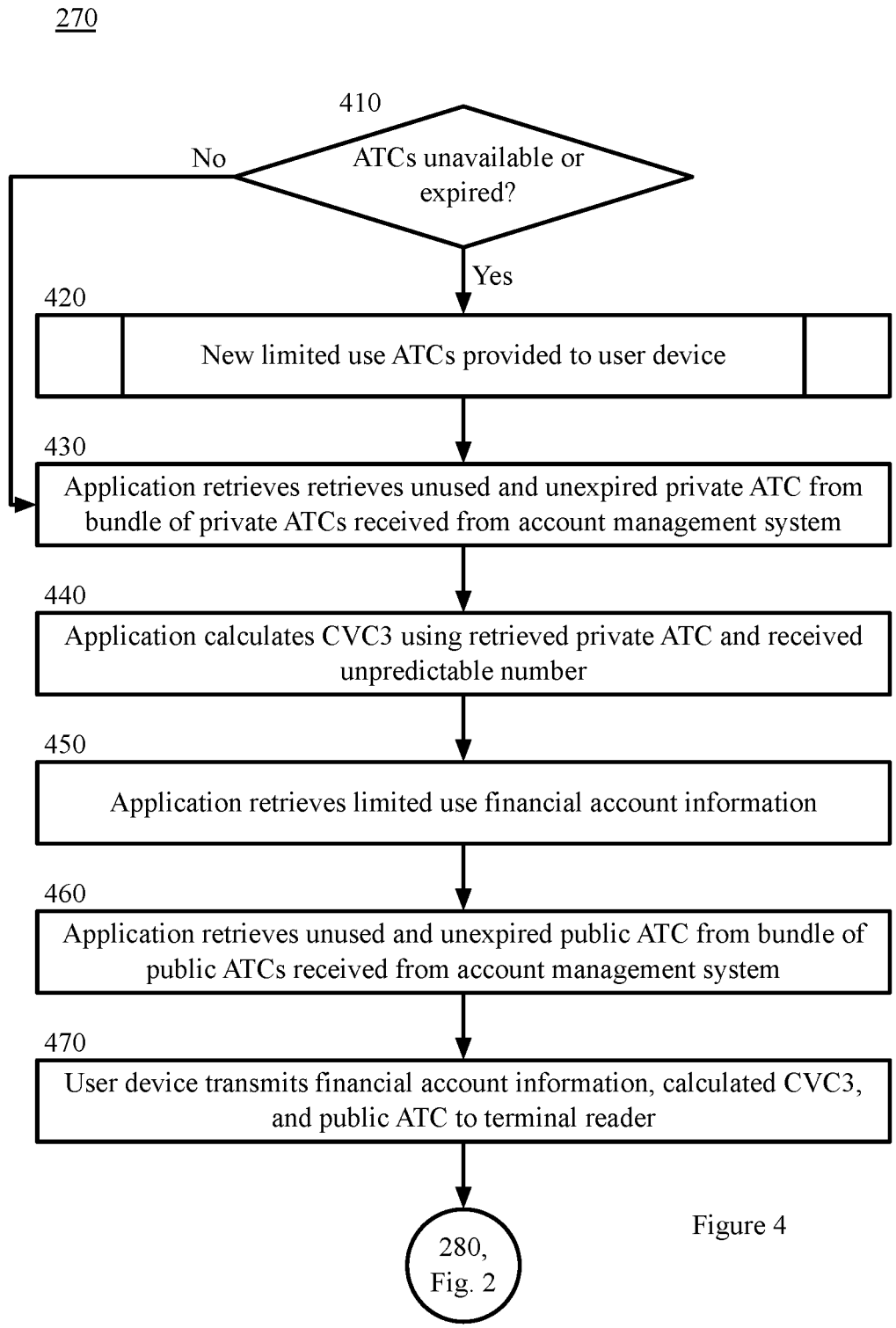
FIG. 4 is a block flow diagram depicting a method for transmitting a calculated dynamic verification code and a public application transaction counter, in accordance with certain example embodiments.

FIG. 4 is a block flow diagram depicting a method 270 for transmitting limited use financial account information, a calculated dynamic card verification code, and a public application transaction counter to a terminal reader, in accordance with certain example embodiments, as referenced in block 270. The method 270 is described with reference to the components illustrated in FIG. 1.

In block 410, the user device 120 determines if ATCs are available for the payment transaction. In an example embodiment, the user device 120 determines if the ATCs are expired (for example, the ATCs are limited in duration and the duration has expired). In another example embodiment, the user device 120 determines if an un-used ATC is available for the payment transaction (for example, the ATCs are limited to 1 per transaction, and the user has exceeded the number of transactions). In an example embodiment, the user device 120 performs this check for the public ATCs, the private ATCs, or both. In an example embodiment, the application 123 makes the determination.

If the ATCs are unavailable (for example, they have all been used), expired, or are otherwise unavailable, the method 270 proceeds to block 420.

In block 420, new limited use ATCs are provided to the user device 120. The method for providing new limited use application transaction counters to a user device 120 is described in more detail hereinafter with reference to the methods described in FIG. 5.

FIG. 5 is a block flow diagram depicting a method 420 for providing new limited use application transaction counters to a user device, in accordance with certain example embodiments, as referenced in block 420. The method 420 is described with reference to the components illustrated in FIG. 1.

In block 510, the application 123 transmits a request to the account management system 130 for new limited use ATCs. In an example embodiment, the request comprises an account identifier, such as the limited use financial account information or other account identifier that enables the account management system 130 to identify the user's account. In an example embodiment, the user is prompted to provide a password, personal identification number, or other form of verification when requesting new limited use ATCs. In another example embodiment, the account management system 130 is notified automatically by the user device 120 when the ATCs expire, are all used, or are otherwise not available and new ATCs are provided to the user device 120 without user involvement.

In block 520, the account management system 130 receives the request for new ATCs.

In block 530, the account management system 130 identifies the user's account management system 130 account. In an example embodiment, the account management system 130 uses the information in the request for new ATCs to identify the user's account. In another example embodiment, the account management system uses information in the user's response to the request for verification to identify the user's account.

In block 540, the account management system 130 creates and logs a new bundle of limited use private ATCs. In an example embodiment, the account management system 130 creates a new bundle of private ATCs in a manner consistent with the methods described previously in connection with block 350.

In block 550, the account management system 130 creates and logs a new bundle of corresponding limited use public ATCs. In an example embodiment, the account management system 130 creates a new bundle of corresponding public ATCs in a manner consistent with the methods described previously in connection with block 360.

In block 560, the account management system 130 transmits the bundle of public ATCs, and the corresponding bundle of private ATCs to the user device 120.

In block 570, the user device 120 receives the bundle of public ATCs, and the corresponding bundle of private ATCs.

In block 580, the user device 120 saves the bundle of public ATCs, and the corresponding bundle of private ATCs. In an example embodiment, the bundle of public ATCs, and the corresponding bundle of private ATCs are saved in the data storage unit 129.

The method 420 then proceeds to block 430 in FIG. 3.

Returning to block 410 in FIG. 4, if ATCs are available and not expired, the method 270 proceeds to block 430 in FIG. 4.

In block 430, the application 123 retrieves one of the bundle of private ATCs. In an example embodiment, each private ATC has a corresponding public ATC. In another example embodiment, the application 123 retrieves the private ATC that corresponds to the next available public ATC.

In block 440, the application 123 calculates the dynamic card verification checksum (CVC3) or other security code using the private ATC. In an example embodiment, the application 123 uses the unpredictable number or other code received from the merchant system 110 in the payment request and the private ATC to calculate the CVC3. In an example embodiment, the application 123 executes an algorithm or other equation known to the account management system 130 to calculate the CVC3 using the private ATC and the unpredictable number received from the merchant system 110.

In block 450, the application 123 retrieves the limited use financial account information or other account identifier that corresponds to the user's account management system 130 account.

In some example embodiments, the account management system 130 transmits one or more sets of limited use financial account information to the user device 120. The application 123 generates the payment account information by accessing the transmitted limited use financial account information and selecting a particular set of account information to use for the transaction. In an example embodiment, the account management system 130 may periodically generate limited use financial account information and update the user's user device 120 with the current set of information. In some example embodiments, the user's user device 120 can communicate a request for limited use financial account information to the account management system 130, and the account management system 130 can, in response, communicate the limited use financial account information to the user's user device 120 for use in the payment transaction. In yet another example embodiment, the application 123 generates the limited use financial account information locally. The application 123 can communicate the generated limited use financial account information to the account management system 130 for verification by the account management system 130 when the account management system 130 receives the payment request from the merchant system 110. In some example embodiments, the application can generate the limited use financial account information using a scheme that can be replicated by the account management system 130 to allow the account management system 130 to verify the generated limited use financial account information when the account management system 130 receives the payment request from the merchant system 110.

The limited use financial account information may have time or geographic limitations. For example, the limited use financial account information may only be valid for a limited amount of time or it may only be valid in a specific geographic location. The limited use financial account information can be stamped with, have encoded therein, or otherwise contain a time reference, a time duration, a geographic position of the user device 120, and/or a geographic region based on a geographic position of the user device 120. These features can allow the limited use financial account information to expire after a specified period of time or when used outside of a specified geographic location. The limited use financial account information may also have limitations on the number of times they may be used. For example, each proxy account number may only be valid for a single use.

In block 460, the application 123 retrieves the corresponding public ATC from the bundle of public ATCs received from the account management system 130. In an example embodiment, the application 123 is capable of determining the corresponding public ATCs. In an example embodiment, used and/or expired ATCs are removed from the user device 120.

In block 470, the user device 120 transmits the limited use financial account information, the calculated CVC3, and the public ATC to the terminal reader 115. In an example embodiment, the information is transmitted in response to the payment request. In an example embodiment, the information is transmitted from the application 123 to the controller 125, where it is converted into a signal understandable by the terminal reader 115 and/or application 117. In an example embodiment, the information is transmitted through the secure communication channel and during the "tap" of the user device 120 with the terminal reader 115.

The method 270 then proceeds to block 280 in FIG. 2.

In block 280, the terminal reader 115 receives the limited use financial account information, the calculated CVC3, and the public ATC from the user device 120.

In block 290, the merchant system 110 processes the payment transaction. The method for approving payment transactions using limited use financial account information, a public application transaction counter, and a calculated dynamic card verification code, is described in more detail hereinafter with reference to the methods described in FIG. 6.

FIG. 6 is a block flow diagram depicting a method 290 for approving payment transactions using limited use financial account information, a public application transaction counter, and a calculated dynamic card verification code, as referenced in block 290. The method 290 is described with reference to the components illustrated in FIG. 1.

In block 610, the terminal reader 115 transmits the limited use financial account information, the CVC3, and the public ATC to the POS terminal 113.

In block 615, the POS terminal 113 receives the limited use financial account information, the CVC3, and the public ATC. In an example embodiment, the application 117 converts the signal into a language understandable by the merchant system 110. In an example embodiment, the user may be prompted to enter a personal identification number ("PIN") into the merchant system 110.

In block 620, the merchant system 110 generates a payment request message to request payment using the payment account information provided by the user device 120 and submits the payment request to the acquirer system 150. In an example embodiment, the merchant's POS terminal 113 submits the request to the acquirer system 150 via a network 130. In an example embodiment, the payment request message comprises the limited use financial account information, the CVC3, the public ATC, and the unpredictable number.

In block 625, the acquirer system 150 receives the payment request.

In block 630, the acquire system 150 transmits the payment request to the account management system 130. In an example embodiment, the acquire system 150 and/or card network 140 automatically makes a determination that routes the limited use financial account information to the account management system 130. In an example embodiment, the determination is made using a series of numbers or routing information in the limited use financial account information. In some example embodiments, the acquire system 150 and/or card network 140 reviews a list of saved account identification information provided to the by the account management system 140.

In block 635, the account management system 130 receives the payment request comprising the limited use financial account information, the CVC3, the public ATC, and the unpredictable number.

In block 640, the account management system 130 identifies the user account associated with the payment request. In an example embodiment, account management system 130 comprises a list of the limited use financial account information and the public ATC generated for each user and can map this information to the user's account. In some example embodiments, a one-way algorithm, such as a hash function, can be used to identify or associate the user's account with the limited use financial account information and/or the public ATC. In yet another example embodiment, a hardware security module (HSM) can be used to store secured data, such as a list of the limited use financial account information and the public ATCs generated for each user. The HSM can be contacted by the account management system 130 over a secure network to map the limited use financial account information and the public ATCs generated for each user to the user's account.

In block 650, the account management system 130 determines whether the public ATC is correct and not expired. In an example embodiment, the account management system 130 determines whether the public ATC is from the current bundle of unexpired ATCs. In another example embodiment, the account management system 130 determines whether the public ATC is the next available public ATC from the bundle of public ATCs transmitted to the user device 120. In this embodiment, the pubic ATCs are used in a predefined sequence known only to the account management system 130 and the user device 120.

If the public ATC is not correct or is expired, the method 290 proceeds to block 655 and the transaction is declined.

Returning to block 650, if the public ATC is correct and not expired, the method 290 proceeds to block 660. In block 660, the account management system 130 determines whether the CVC3 or other calculated security code is correct. In an example embodiment, the payment request comprises the unpredictable number or other code used by the user device 120 to calculate the CVC3. In this embodiment, the account management system 130 uses the public ATC to look up and retrieve the corresponding private ATC.

Using the retrieved private ATC and the unpredictable number, the account management system 130 recalculates the CVC3. The account management system 130 compares the CVC3 received in the payment request to the CVC3 recomputed by the account management system 130 to determine if the CVC3 number in the payment request is correct.

In another example embodiment, the account management system 130 uses the private ATC and the CVC3 number to reverse-compute the unpredictable number. The account management system 130 compares the calculated unpredictable number to the unpredictable number from the payment request to determine if the CVC3 number is correct.

If the CVC3 number is not correct, the method 290 proceeds to block 655 and the transaction is declined.

Returning to block 660, if the CVC3 number is correct, the method 290 proceeds to block 670. In block 670, the account management system retrieves the saved financial account information that corresponds to the limited use financial account information received in the payment request. In an example embodiment, the account management system 130 identifies the user's saved payment account information. In an example embodiment, the user's account contains the rules defined by the user (or the default rules if the user has not modified the default rules). If the user has defined payment rules, the account management system 130 applies the user-defined rules first to determine the order to apply the payment accounts to the transaction. In an example embodiment, the account management system 130 applies the user-defined rules first.

In block 680, the account management system 130 generates and transmits a new payment request to the issuer system 160 of the selected payment account via the card network 140. In some example embodiments, the account management system 130 is the issuer system 160 of the payment account. In this embodiment, the account management system 130 will determine whether sufficient funds are available for the transaction and approve/deny the transaction accordingly.

In an example embodiment, the issuer system 160 receives the new payment request from the account management system 130 and approves or declines the transaction.

In block 690, the account management system 130 determines whether the new payment request was approved or declined. In an example embodiment, the account management system 130 receives notice of an approved or declined transaction from the issuer system 150.

If the transaction is declined, the method proceeds to block 655 and the account management system 130 notifies the merchant system 110 of the declined transaction.

Returning to block 690, if the transaction is approved, the method proceeds to block 695. In an example embodiment, the issuer system 160 transmits an authorization message to the account management system 130, and the account management system 130 transmits an approval of the original payment request to the merchant system 110 through the acquirer system 150. In an example embodiment, the issuer system 160 debits the user's financial account for the amount of the payment transaction and the account management system 130 receives a credit or payment in the amount of the payment transaction. The account management system 130 then credits the merchant system 110 the amount of the payment transaction.

Other Example Embodiments

Figure 7:
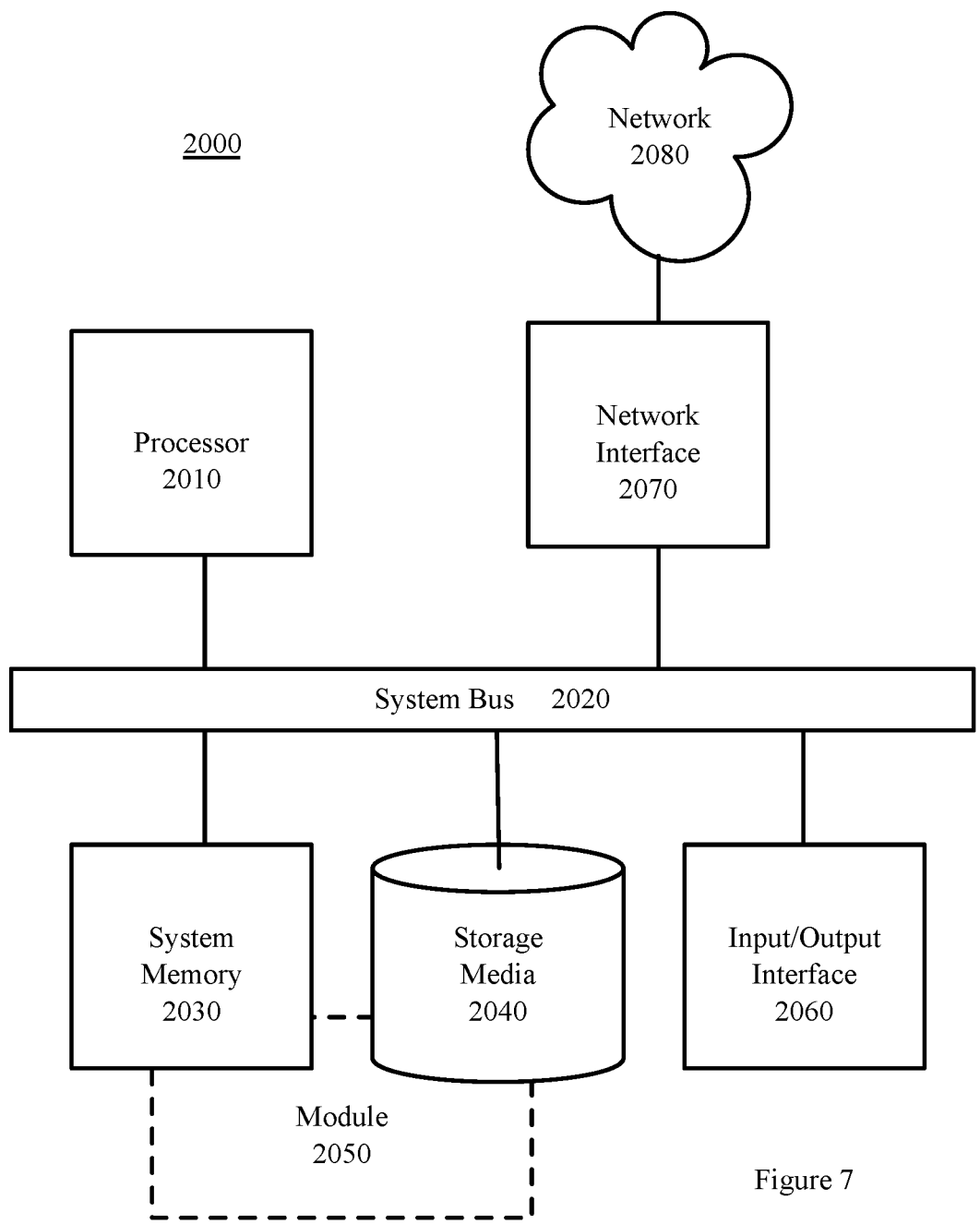
FIG. 7 is a block diagram depicting a computer machine and module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to securely interface between non-secure element processors and service provider systems, comprising:
    a mobile computing device comprising a non-secure element storage device and a non-secure element processor communicatively coupled to the non-secure element storage device, wherein the non-secure element processor executes application code instructions that are stored in the non-secure element storage device to cause the mobile computing device to:
        receive, from a merchant computing device, a request comprising a random number;
        retrieve one of a bundle of public limited use values and a corresponding one of a bundle of private limited use values from the non-secure element storage device;
        generate a security code using the random number and the one of the bundle of private limited use value;
        generate a response to the request comprising (1) the public limited use value that corresponds to the private limited use value used to generate the security code and (2) the generated security code;
        transmit, to the merchant computing device, the response to the request, wherein the response to the request is transmitted by the merchant computing device to an account management computing system for approval; and
        receive an approval notification indicating that the account management computing system confirmed the validity of the generated security code using the received public limited use value.

2. The system of claim 1, wherein the non-secure element processor further executes application code instructions that are stored in the non-secure element storage device to cause the system to determine that the one of the bundle of public limited use values and the corresponding one of the bundle of private limited use values are available.

3. The system of claim 1, wherein the account management computing system uses the public limited use value included in the response to retrieve the corresponding private limited use value, and uses the retrieved corresponding private limited use value to recompute the generated security code.

4. The system of claim 3, wherein the account management computing system confirms a validity of the generated security code by confirming the recomputed security code matches the generated security code included in the response to the request.

5. The system of claim 1, wherein the non-secure element processor executes further application code instructions that are stored in the non-secure element storage device to cause the system to receive the bundle of public limited use values from a separate computing system.

6. The system of claim 1, wherein the bundle of public limited use values comprises a set of randomly generated values that are limited in time and number.

7. The system of claim 1, wherein the account management computing system confirms validity of the security code generated using the random number and the private limited use value.

8. The system of claim 7, wherein confirming the validity of the generated security code comprises determining that the public limited use value is not expired and not previously used.

9. A computer-implemented method to securely interface between non-secure element processors and service provider systems, comprising:
    by a non-secure element processor of a mobile computing device:
        receiving, from a service provider computing device, a request comprising a random number;
        retrieving one of a bundle of public limited use values and a corresponding one of a bundle of private limited use values;
        generating a security code using the random number and the private limited use value;
        generating a response to the request comprising (1) the public limited use value that corresponds to the private limited use value used to generate the security code and (2) the generated security code;
        transmitting, to the service provider computing device; the response to the request, wherein the response to the request is transmitted by the service provider computing device to an account management computing system for approval; and
        receiving an approval notification indicating that the account management computing system confirmed the validity of the generated security code using the received public limited use value.

10. The computer-implemented method of claim 9, further comprising determining, by the non-secure element processor of the mobile computing device, that the public limited use value and the corresponding private limited use value are available.

11. The computer-implemented method of claim 9, wherein the account management computing system uses the public limited use value included in the response to retrieve the corresponding private limited use value, and uses the retrieved corresponding private limited use value to recompute the generated security code.

12. The computer-implemented method of claim 11, wherein the account management computing system confirms a validity of the generated security code by confirming the recomputed security code matches the generated security code included in the response to the request.

13. The computer-implemented method of claim 9, wherein the bundle of public limited use values comprises a set of randomly generated values that are limited in time and number.

14. The computer-implemented method of claim 9, wherein the account management computing system confirms validity of the security code generated using the random number and the private limited use value.

15. The computer-implemented method of claim 14, wherein confirming the validity of the generated security code comprises determining that the public limited use value is not expired and not previously used.

16. A computer program product, comprising:
a non-transitory computer-readable storage device having computer-executable program instructions embodied therein that when executed by a computer cause the computer to securely interface between non-secure element processors and service provider systems, comprising computer-readable program instructions to:

receive, from a service provider computing device, a request comprising a random number;
retrieve one of a bundle of public limited use values and a corresponding one of a bundle of private limited use values;
generate a security code using the random number and the private limited use value;
generate a response to the request comprising (1) the public limited use value that corresponds to the private limited use value used to generate the security code and (2) the generated security code;
transmit, to the service provider computing device, the response to the request, wherein the response to the request is transmitted by the service provider computing device to an account management computing system for approval; and
receive an approval notification indicating that the account management computing system confirmed the validity of the generated security code using the received public limited use value.

17. The computer program product of claim 16, further comprising computer-readable program instructions to determine that the public limited use value and the corresponding private limited use value are available.

18. The computer program product of claim 16, wherein the bundle of public limited use values comprises a set of randomly generated values that are limited in time and number.

19. The computer program product of claim 16, wherein the account management computing system confirms validity of the security code generated using the random number and the private limited use value.

20. The computer program product of claim 19, wherein confirming the validity of the generated security code comprises determining that the public limited use value is not expired and not previously used.

* * * * *